Patented Aug. 8, 1939

2,168,933

UNITED STATES PATENT OFFICE 2,168,933

PURIFICATION OF GASES

Fritz Giller, Mannheim, and Fritz Winkler, Ludwigshafen-on-the-Rhine, Germany, assignors to I. G. Farbenindustrie Aktiengesellschaft, Frankfort-on-the-Main, Germany No Drawing. Application July 9, 1937, Serial No. 152,752. In Germany July 14, 1936

3 Claims. (Cl. 23—3)

The present invention relates to the purification of gases and more especially to a process of removing organic sulphur compounds from technichal gases such as water gas and the like.

In order to prepare gases free from sulphur, when starting from gases containing carbon oxysulphide, it has been proposed to lead the latter together with oxygen or gases containing oxygen over active charcoal having an alkaline condition. For this purpose wood charcoal has especially been proposed which has been obtained by heating wood with metal chlorides which are capable of splitting off hydrogen chloride. In this way it is possible to render hydrogen containing 1 milligram of sulphur in the form of carbon oxysulphide and the like per cubic meter, practically free from sulphur.

We have now found that for the removal of organically-combined sulphur from gases in the said manner an active charcoal is extremely advantageous which has been prepared from mineral coals according to the specification of Letters Patent No. 1,582,718 by treating mineral coal in a shaft furnace with hot combustion gases which are blown through the coal with sufficient pressure to establish a strong agitation of the coal. With this charcoal it is possible to desulphurize practically completely even those gases which contain 150 milligrams and more of organically combined sulphur per cubic meter.

For the technical performance of the purifying process it is highly favorable that the said charcoal retains its activity practically undiminished even when the moisture content of the gas to be purified fluctuates strongly, which is often the case with technical gases.

The following example will further illustrate the nature of this invention but the invention is not restricted to this example.

Example 55 kilograms of an active charcoal prepared from mineral coal according to the specification of Letters Patent No. 1,582,718 are charged into a tower having a cross section of 572 square centimeters. Water gas containing from 140 to 160 milligrams of organically-combined sulphur per cubic meter but no hydrogen sulfide is led through the tower at ordinary temperature. With each cubic meter of water gas, 1 liter of air and 200 cubic centimeters of ammonia gas have been incorporated previously. The speed of flow of the watergas in the tower amounts to 21.4 cubic meters per hour. The gas leaving the apparatus contains only 0.38 milligram of organically-combined sulphur per cubic meter.

What we claim is:

1. The process of removing substantially only organic sulphur compounds from gases containing the same which consists in treating the gas in the presence of oxygen and under alkaline conditions with an active charcoal which has been prepared by treating mineral coal in a shaft furnace with hot combustion gases which are blown through the coal with sufficient pressure to establish a strong agitation of the coal.

2. The process of removing substantially only organic sulphur componds from water gas which consists in treating the gas with an active charcoal which has been prepared by treating mineral coal in a shaft furnace with hot combustion gases which are blown through the coal with sufficient pressure to establish a strong agitation of the coal, after small amounts of air and ammonia gas having been admixed to the water gas to be purified.

3. The process of removing substantially only organic sulphur compounds from water gas which consists in treating the gas with an active charcoal which has been prepared by treating mineral coal in a shaft furnace with hot combustion gases which are blown through the coal with sufficient pressure to establish a strong agitation of the coal, after 1 liter of air and 200 cubic centimeters of ammonia gas having been admixed to each cubic meter of the water gas to be purified.

FRITZ GILLER.
FRITZ WINKLER.